US009878377B2

(12) United States Patent
Short et al.

(10) Patent No.: US 9,878,377 B2
(45) Date of Patent: Jan. 30, 2018

(54) HIGH-SPEED ROTARY ELECTRICAL CONNECTOR FOR USE IN ULTRASONICALLY ASSISTED MACHINING

(71) Applicant: Edison Welding Institute, Inc., Columbus, OH (US)

(72) Inventors: Matthew A. Short, Wilmington, OH (US); Jacob Hay, Circleville, OH (US); Lance S. Cronley, Mt. Victory, OH (US)

(73) Assignee: EDISON INDUSTRIAL INNOVATION, LLC, Bowling Green, KY (US)

( * ) Notice: Subject to any disclaimer, the term of this patent is extended or adjusted under 35 U.S.C. 154(b) by 0 days.

(21) Appl. No.: 14/846,064

(22) Filed: Sep. 4, 2015

(65) Prior Publication Data
US 2016/0067791 A1    Mar. 10, 2016

Related U.S. Application Data

(63) Continuation of application No. 14/998,002, filed on Sep. 5, 2014, now abandoned, which is a
(Continued)

(51) Int. Cl.
*B23B 37/00* (2006.01)
*B23B 31/02* (2006.01)
(Continued)

(52) U.S. Cl.
CPC .............. *B23B 37/00* (2013.01); *B23B 31/02* (2013.01); *B23B 31/083* (2013.01);
(Continued)

(58) Field of Classification Search
CPC ..... B06B 1/00; B06B 1/02; A61B 17/320068; H02N 2/103; H01L 41/09; A61C 17/20;
(Continued)

(56) References Cited

U.S. PATENT DOCUMENTS 3,561,462 A * 2/1971 Jugler ........................ B06B 1/06
                                                  173/117
3,614,484 A * 10/1971 Shoh ......................... B24B 1/04
                                                  228/1.1
(Continued)

FOREIGN PATENT DOCUMENTS

DE        10340696 A1 * 10/2004 ........... B23Q 1/0009
JP      2002219606 A  *  8/2002
JP  WO 2009101987 A1 *  8/2009 ......... B23B 31/1179

OTHER PUBLICATIONS

Machine translation, WIPO published document, WO 2009101987A1, "Cutting/Grinding Device", Ohnishi K., Aug. 20, 2009.*
(Continued)

*Primary Examiner* — Daniel Howell
*Assistant Examiner* — Chwen-Wei Su
(74) *Attorney, Agent, or Firm* — Vance Intellectual Property, PC

(57) ABSTRACT

An ultrasonic machining module that includes an ultrasonic transducer, wherein the ultrasonic transducer is adapted to receive a machining tool; a vibration-isolating housing adapted to be both compatible with a machining system and to receive the ultrasonic transducer therein, wherein the housing further includes at least one modification for isolating all vibrations generated by the ultrasonic transducer when the device is in operation except axial vibrations transmitted to the machining tool, thereby preventing unwanted vibrations from traveling backward or upward into the machining system; and a connector in electrical communication with the ultrasonic transducer, wherein the connector is operative to supply electrical energy to the ultrasonic transducer, and wherein the connector is adapted to rotate at a predetermined rate of speed.

11 Claims, 10 Drawing Sheets

Related U.S. Application Data continuation-in-part of application No. 13/046,099, filed on Mar. 11, 2011, now Pat. No. 8,870,500.

(60) Provisional application No. 61/312,738, filed on Mar. 11, 2010.

(51) Int. Cl.
  *B23B 31/08* (2006.01)
  *B23Q 1/00* (2006.01)
  *B23Q 11/10* (2006.01)

(52) U.S. Cl.
  CPC ....... *B23B 2240/28* (2013.01); *B23B 2250/12* (2013.01); *B23B 2250/16* (2013.01); *B23B 2260/108* (2013.01); *B23Q 1/0009* (2013.01); *B23Q 11/1023* (2013.01); *Y10S 408/70* (2013.01); *Y10T 408/23* (2015.01)

(58) Field of Classification Search
  CPC ... B23B 37/00; B23B 2240/28; B23B 29/125; B23B 2250/16; B23B 2270/10; B23B 2260/108; B23Q 1/0009; Y10S 408/70; Y10T 408/23; Y10T 409/309408; Y10T 409/30952
  USPC ............. 439/13, 23, 24, 25, 26; 310/323.18, 310/323.12, 323.01, 323.02, 323.03, 310/323.16, 323.19
  See application file for complete search history.

(56) References Cited

U.S. PATENT DOCUMENTS

| | | | | |
|---|---|---|---|---|
| 4,294,500 | A | * | 10/1981 | Wilson .................. H01R 39/00 310/232 |
| 4,854,881 | A | | 8/1989 | Ditzig |
| 2006/0229132 | A1 | * | 10/2006 | Sander .................... B23B 37/00 464/51 |
| 2008/0041604 | A1 | * | 2/2008 | Sauer ...................... B23B 31/02 173/217 |
| 2009/0133546 | A1 | | 5/2009 | Araie et al. |
| 2009/0146530 | A1 | | 6/2009 | Tang et al. |
| 2011/0222975 | A1 | | 9/2011 | Short |
| 2011/0268516 | A1 | | 11/2011 | Short |
| 2013/0028675 | A1 | | 1/2013 | Vogler et al. |

OTHER PUBLICATIONS

Machine translation, German patent document, DE 10340696A1, "Telemetry system for rotating material removal tool has stator with ring part(s) arranged on pivot drive with which it can be moved into and out of active position relative to central spindle axle", Aschenbach, B., Oct. 2004.*

International Search Report and Written Opinion of the International Searching Authority received in PCT/2015/048589, dated Dec. 4, 2015.

* cited by examiner

HIGH-SPEED ROTARY ELECTRICAL CONNECTOR FOR USE IN ULTRASONICALLY ASSISTED MACHINING

CROSS-REFERENCE TO RELATED APPLICATIONS

This patent application is a continuation-in-part of U.S. patent application Ser. No. 14/998,002 filed on Sep. 5, 2014 and entitled "High-Speed Rotary Electrical Connector for Ultrasonically Assisted Machining", which was originally filed as U.S. Patent Application 62/046,655 and subsequently converted to U.S. patent application Ser. No. 14/998,002. U.S. patent application Ser. No. 14/998,002 is a continuation-in-part of U.S. patent application Ser. No. 13/046,099 filed on Mar. 11, 2011 and entitled "Ultrasonic Machining Module", now U.S. Pat. No. 8,870,500, which claimed the benefit of U.S. Patent Application Ser. No. 61/312,738 filed on Mar. 11, 2010 and entitled "Accessory Module for Applying Ultrasonic Energy to Machining Tools". The disclosures of all of these previously filed applications are incorporated by reference herein in their entirety and made part of the present patent application for all purposes.

BACKGROUND OF THE INVENTION

The described invention relates generally to systems for machining metals and other materials and more specifically to a system for machining metals and other materials into which an ultrasonic machining module has been incorporated, wherein the ultrasonic machining module is compatible with a variety of existing machining systems, devices, and processes due to its vibration-isolating characteristics.

Machining, which is a collective term for drilling, milling, reaming, tapping, and turning, is an enabling technology that impacts virtually all aspects of manufacturing in the United States and elsewhere in the world. In a specific example, a milling machine is a machining tool used to machine solid materials. Milling machines are typically classified as either horizontal or vertical, which refers to the orientation of the main spindle. Both types range in size from small, bench-mounted devices to much larger machines suitable for industrial purposes. Unlike a drill press, which holds the workpiece stationary as the drill moves axially to penetrate the material, milling machines move the workpiece axially and radially against the rotating milling cutter, which cuts on its sides as well as its tip. Milling machines are used to perform a vast number of operations, from simple tasks (e.g., slot and keyway cutting, planing, drilling) to complex tasks (e.g., contouring, diesinking).

Cutting and drilling tools and accessories used with machining systems (including milling machines) are often referred to in the aggregate as "tooling". Milling machines often use CAT or HSK tooling. CAT tooling, sometimes called V-Flange tooling, is the oldest and probably most common type used in the United States. CAT tooling was invented by Caterpillar Inc. of Peoria, Ill., to standardize the tooling used on Caterpillar machinery. HSK tooling, sometimes called "hollow shank tooling", is much more common in Europe where it was invented than it is in the United States. The holding mechanism for HSK tooling is placed within the hollow body of the tool and, as spindle speed increases, it expands, gripping the tool more tightly with increasing spindle speed.

Improving the machinability of certain materials is of significant interest to manufacturers of military equipment and certain commercial hardware, as well as to the builders of machine tools. More specifically, very advanced materials such as armor plates and composites are notoriously difficult to machine with standard systems and methods. High-speed systems and ultra-hard tool bits are used for such material, but provide only a marginal increase in tool life and productivity. Significant improvements in the machinability of materials have been achieved by implementing advanced technologies such as laser, waterjet, and EDM cutting. However, these processes are high in capital cost, limited in application, and differ too much to be used in standard machine shops. Also, the application of these processes is limited to certain types of cuts in the materials on which they are typically used.

Ultrasonic-assisted machining was developed in the United States in the 1950's and was used for machining materials that were considered to be difficult to machine at the time. The more modern process of ultrasonic machining (UM) involves the application of high power ultrasonic vibrations to "traditional" machining processes (e.g., drilling, turning, milling) for improving overall performance in terms of faster drilling, effective drilling of hard materials, increased tool life, and increased accuracy. This is typically accomplished by using drill bits manufactured from high speed steel (HSS), carbide, cobalt, polycrystalline diamond composite, or other suitable materials affixed to a collet (e.g., shrink fit, compression, hydraulic, or mechanical) that is affixed to an ultrasonic (US) transmission line. In this context, UM is not the existing ultrasonic-based slurry drilling process (i.e., impact machining) used for cutting extremely hard materials such as glass, ceramics, quartz. Rather, this type of UM concerns methods for applying high power ultrasonics to drills, mills, reamers, taps, turning tools, and other tools that are used with modern machining systems.

Although the use of ultrasonics with modern machining systems provides significant and numerous benefits, there are certain technical challenges involved, not the least of which is the incorporation of ultrasonic energy into machining systems that were not originally designed to accommodate this type of energy output. Thus, there is an ongoing need for an ultrasonic machining module that is compatible with and that may be incorporated into existing machining systems without damaging or negatively impacting the performance of such systems.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a first device for use in a machining system is provided. This device includes an ultrasonic machining module that further includes an ultrasonic transducer, wherein the ultrasonic transducer is adapted to receive a machining tool; a vibration-isolating housing adapted to be both compatible with a machining system and to receive the ultrasonic transducer therein, wherein the housing further includes at least one modification for isolating all vibrations generated by the ultrasonic transducer when the device is in operation except axial vibrations transmitted to the machining tool, thereby preventing unwanted vibrations from traveling backward or upward into the machining system; and a connector in electrical communication with the ultrasonic transducer, wherein the connector is operative to supply electrical energy to the ultrasonic transducer, and wherein the connector is adapted to rotate at a predetermined speed.

In accordance with another aspect of the present invention, a second device for use in a machining system is provided. This device also includes an ultrasonic machining module that further includes an ultrasonic transducer, wherein the ultrasonic transducer is adapted to receive a machining tool; a vibration-isolating housing adapted to be both compatible with a machining system and to receive the ultrasonic transducer therein, wherein the housing further includes at least one modification for isolating all vibrations generated by the ultrasonic transducer when the device is in operation except axial vibrations transmitted to machining tool, thereby preventing unwanted vibrations from traveling backward or upward into the machining system; a connector in electrical communication with the ultrasonic transducer, wherein the connector is operative to supply electrical energy to the ultrasonic transducer, and wherein the connector is adapted to rotate at a predetermined speed; and a tool holder, wherein the tool holder and the top portion of the housing are mechanically coupled to one another or are integrated with one another, and wherein the connector is adapted to be mounted to the tool holder.

In yet another aspect of this invention, a third device for use in a machining system is provided. This device also includes an ultrasonic machining module that further includes an ultrasonic transducer, wherein the ultrasonic transducer is adapted to receive a machining tool; a vibration-isolating housing adapted to be both compatible with a machining system and to receive the ultrasonic transducer therein, wherein the housing further includes at least one modification for isolating all vibrations generated by the ultrasonic transducer when the device is in operation except axial vibrations transmitted to machining tool, thereby preventing unwanted vibrations from traveling backward or upward into the machining system; a connector in electrical communication with the ultrasonic transducer, wherein the connector is operative to supply electrical energy to the ultrasonic transducer, and wherein the connector is adapted to rotate at a predetermined speed; and a spindle assembly, wherein the connector is adapted to be mounted on one end of the spindle assembly.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Exemplary embodiments of the present invention are now described with reference to the Figures. Although the following detailed description contains many specifics for purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

Figure 1:
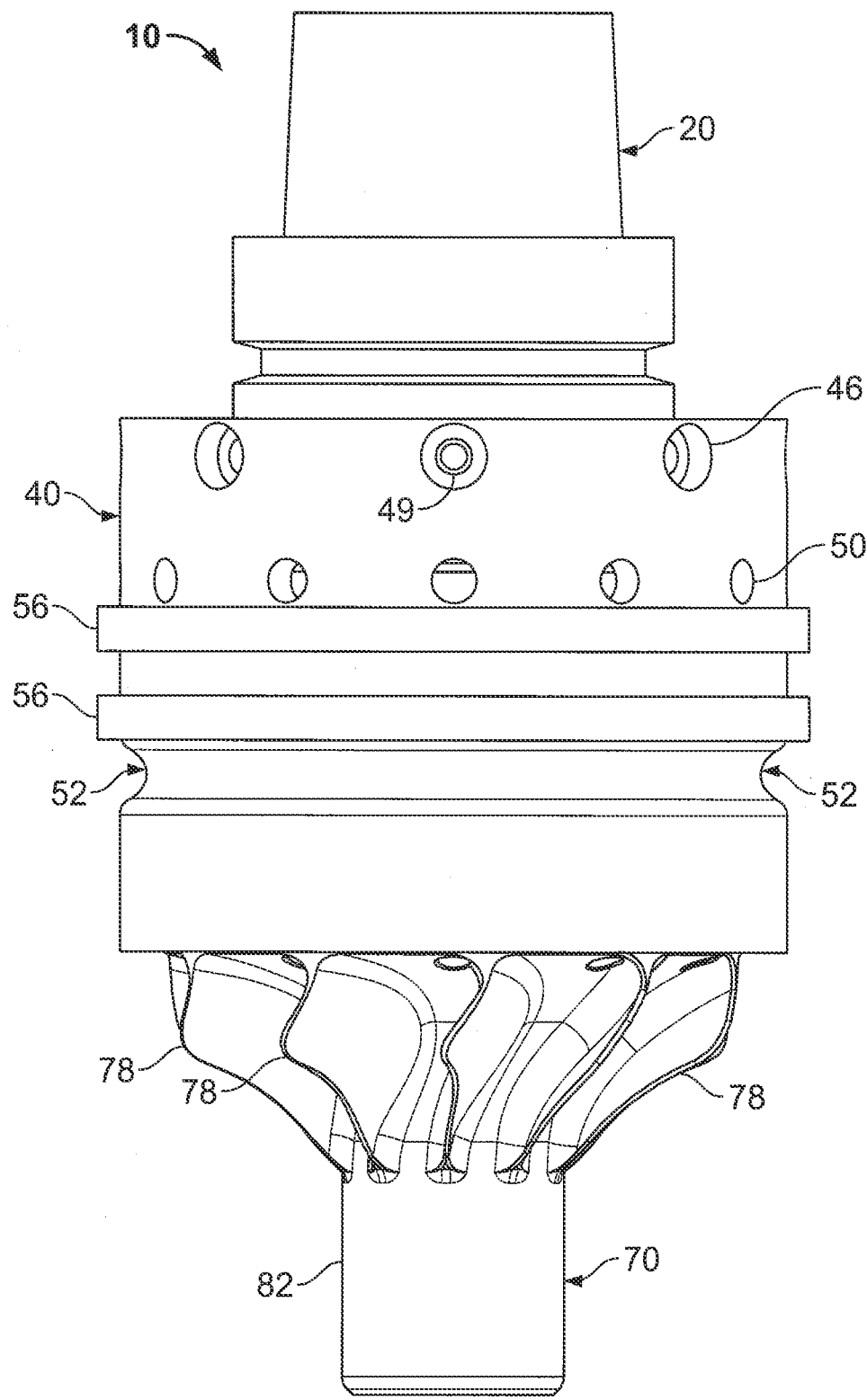
FIG. 1 is a side view of an ultrasonic machining module in accordance with a first exemplary embodiment of the present invention.
Figure 2:
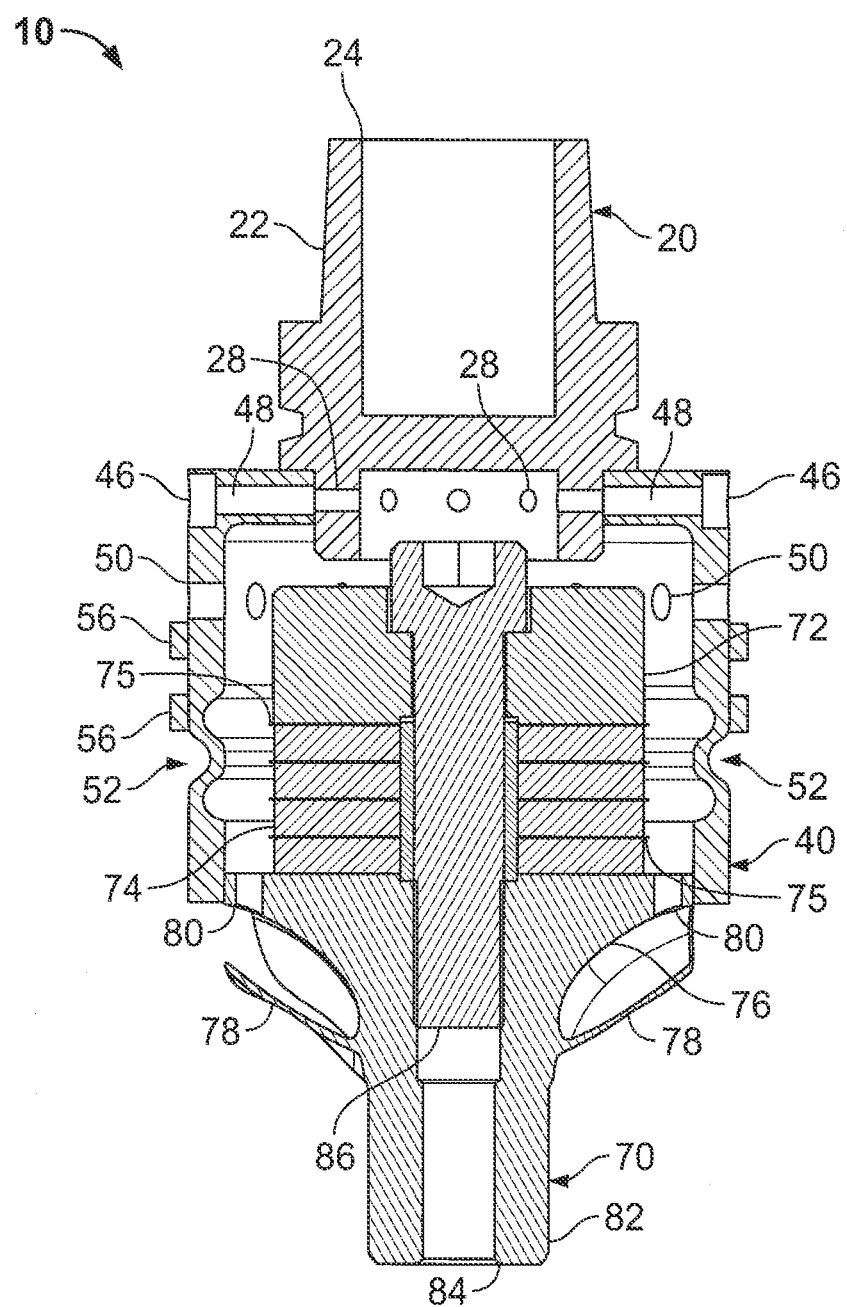
FIG. 2 is a cross-sectional view of the ultrasonic machining module of FIG. 1.

The present invention provides various ultrasonic machining modules that have been adapted for incorporation into existing commercially available machining systems that were not originally designed to accommodate such ultrasonic modules. With reference to FIGS. 1-2, a first exemplary embodiment of the present invention provides an ultrasonic machining module for use in a machining system, wherein the ultrasonic machining module includes: (a) an ultrasonic transducer, wherein the ultrasonic transducer is adapted to receive a tool bit, and wherein the ultrasonic transducer further comprises: (i) a front mass; (ii) a back mass; (iii) a plurality of piezoelectric ceramics positioned between the front mass and back mass; (iv) at least one electrical connector; and (v) a bolt passing through the front mass, back mass, and ceramics, wherein the bolt is operative to apply compressive force to the ceramics; and (b) a vibration-isolating housing adapted to be both compatible with a machining system and to receive the ultrasonic transducer therein. The housing further includes a spring-like feature formed radially therein above the front mass, wherein the spring-like feature further includes a curved and thinned section of the housing, and wherein the curved and thinned section of the housing is operative to permit flexion in the housing for isolating all vibrations generated by the ultrasonic transducer when the device is in operation except axial vibrations transmitted to the tool bit, thereby preventing unwanted vibrations from traveling backward or upward into the machining system and potentially causing damage to the system or other problems. This particular embodiment is disclosed in U.S. patent application Ser. No. 13/046,099 (now U.S. Pat. No. 8,870,500), which is expressly incorporated by reference herein in its entirety, for all purposes.

With reference to FIGS. 1-2, an exemplary embodiment of ultrasonic machining module 10 includes three basic components: tool holder 20, housing 40, and ultrasonic transducer assembly 70. Tool holder 20 includes upper portion 22, which further includes primary bore 24 formed therein for attaching machining module 10 to the main spindle (e.g., CAT 40, 60 or HSK) of a machining system (not shown). Lower portion 26 of tool holder 20 includes a plurality of secondary bores 28 that cooperate with similar structures in housing 40 to mechanically couple tool holder 20 to housing 40 using connectors 49 (i.e., centering bolts). In some embodiments of the present invention, tool holder 20 is shrink-fit to housing 20 in addition to or instead of being bolted thereto.

Housing 40 includes a rigid cylindrical body 42 that further includes a centrally located aperture 44 that is adapted to receive tool holder 20, and a bottom opening 54, into which ultrasonic transducer assembly 70 is inserted. Circumferential electrical contacts 56 (i.e., slip rings) are positioned on the exterior of housing 40. As will be appreciated by the skilled artisan, the use of other types of electrical contacts is possible with this invention. For example, a single contact 56 may be utilized or the contacts may extend through the spindle of the machining system, while still providing or maintaining the flow of cooling air through the spindle. The top or upper portion of housing 40 includes a plurality of apertures 46 that connect to a plurality of bores 48 that correspond to the placement of bores 28 in tool holder 20 when machining module 10 is assembled. A series of connectors 49 are inserted into bores 48 and 28 for the purpose of bolting tool holder 20 to housing 40. A plurality of air outlets 50 is formed in housing 20. As described in greater detail below, air outlets 50 cooperate with specific structures on ultrasonic transducer assembly 70 to cool machining module 10 when in use, thereby reducing or eliminating the need for any separate or external system or apparatus for cooling piezoelectric ceramics 74.

Housing 40 also includes circumferential region 52, which acts as a vibration isolating spring, and as such is characterized as a "spring-like structure". In the exemplary embodiment, region 52 includes a contoured and thinned section of the material from which housing 40 is manufactured. When machining module 10 is in use, region 52 permits a degree of flexion in housing 40, thereby absorbing and/or isolating acoustic energy generated by ultrasonic transducer assembly 70 and preventing unwanted vibration from traveling backward or upward into the spindle or other mechanical components of the machining system. Axial vibration generated by ultrasonic transducer assembly 70 is not diminished by region 52; therefore, torque is still delivered to the tool bit or other item that is attached to front mass 76 and that is being used to machine a workpiece. Within the context of this invention, the term "tool bit" should be understood to mean drill bit or any other item that is attached to front mass 76. Essentially, region 52 is operative to absorb and/or isolate most or all vibrational modes except the axial vibrations directed toward the workpiece.

Ultrasonic transducer assembly 70 includes back mass 72, front mass 76, and a plurality of piezoelectric ceramics 74 positioned between these two structures. A plurality of electrodes 75 are sandwiched between piezoelectric ceramics 74, and bolt 86 passes through back mass 72, ceramics 74, electrodes 75 and a portion of front mass 76. When tightened, bolt 86 is operative to apply compressive force to piezoelectric ceramics 74. Although not shown in the Figures, a series of electrical lead wires are typically attached to at least one of the electrodes 75. These wires exit the interior of housing 40 either through housing 40 or through tool holder 20 where they then connect to circumferential electrical contacts 56. Brush contacts or other types of electrical contacts may be used to provide electricity to machining module 10. Transducer assembly 70 typically operates at power levels ranging from 1 kW-5 kW and amplitudes ranging from 25 μm to 150 μm.

In the exemplary embodiment of ultrasonic machining module 10 shown in FIGS. 1-2, ultrasonic transducer assembly 70 further includes a plurality of cooling members, fins or vanes 78 that are located circumferentially around front mass 76 just beneath a plurality of air inlets 80 that are also formed in front mass 76. When ultrasonic machining module 10 rotates, vanes 78, which simulate a compressor wheel, are operative to draw air upward and through air inlets 80. Air then flows through the interior of housing 40 across ceramics 74 for cooling purposes, and exits housing 40 though air outlets 50. As shown in the Figures, the front or bottom area of front mass 76 includes a tapered collet 82 that further includes bore 84, which is adapted to receive a drill bit, milling tool, or other item. As will be appreciated by the skilled artisan, a drill bit or other item (not shown) may be attached to collet 82 using the process known as shrink-fitting. By heating the mass around bore 84 uniformly, it is possible to significantly expand the diameter of the bore. The shaft of a drill bit or other item is then inserted into the expanded bore. Upon cooling, the mass around the bore shrinks back to its original diameter and frictional forces create a highly effective joint. In an exemplary embodiment, the bottom edge of housing 40 is attached to the top portion of front mass 76 using a shrink-fit process for facilitating removal of case 40 for repairing ultrasonic machining module 10. As will be appreciated by the skilled artisan, other means of attaching tooling items to front mass 76 and/or attaching housing 40 to transducer assembly 70 are possible and are compatible with the present invention.

Some or all of the metal components of ultrasonic machining module 10 are typically manufactured from A2 tool steel. Alternately, D2, SS, 4140, and/or 350-M tool steel may be used. Regardless of the material used, front mass 76 and back mass 72 may both be manufactured from the same material as a means for reducing amplitude. In general terms, mixing of the mass of these components adjusts amplitude. In the exemplary embodiment shown in FIGS. 1-2, total module length is about 7.5 inches (19.1 cm). However, the present invention is scalable and miniaturized variants of ultrasonic machining module 10 are compatible with medical and surgical systems and devices, among other applications.

In addition to the features described above, the present invention also includes features that permit the introduction of the high-voltage signals that are used to operate high-power ultrasonic systems within a machining or metalworking environment. In the embodiments described below, this invention is capable of transmitting voltages over 400 VAC at power levels up to 10 kW through the use of a high-speed rotary connector. Additionally, this connector is designed such that the inner body thereof acts as a rotor which is affixed to the machine spindle while the stator is affixed to the spindle face. Electrical contact is established through a plunger affixed to the stator that makes the appropriate electrical connection. Additionally, the entire system is typically purged with pressurized air which flows through a series of labyrinth seals to eliminate the possibility of fluid ingress in embodiments that include through-spindle coolant systems. One of the most important aspects of the air delivery system is that the pressurized air be delivered at over 30 psi for: (i) creating stability of the air bearing, thereby allowing the system to rotate up to 80,000 RPM; and (ii) unlocking the system position brake for tool changing events. The system position brake is responsible for orientating the stator to the machine spindle and electrical plunger in the same orientation at each tool change. The electrical connection is made by a series of electrodes that include graphite brushes, copper electrodes, nickel plated disks, fiber fingers, carbon rods, and other components. This is an important aspect of these embodiments, as the rotary connector is capable of accommodating diameters in excess of one (1) inch, which must withstand extremely high surface velocities. Other materials that can be used are electrically conductive liquid metals such as gallium and mercury.

Figure 3:
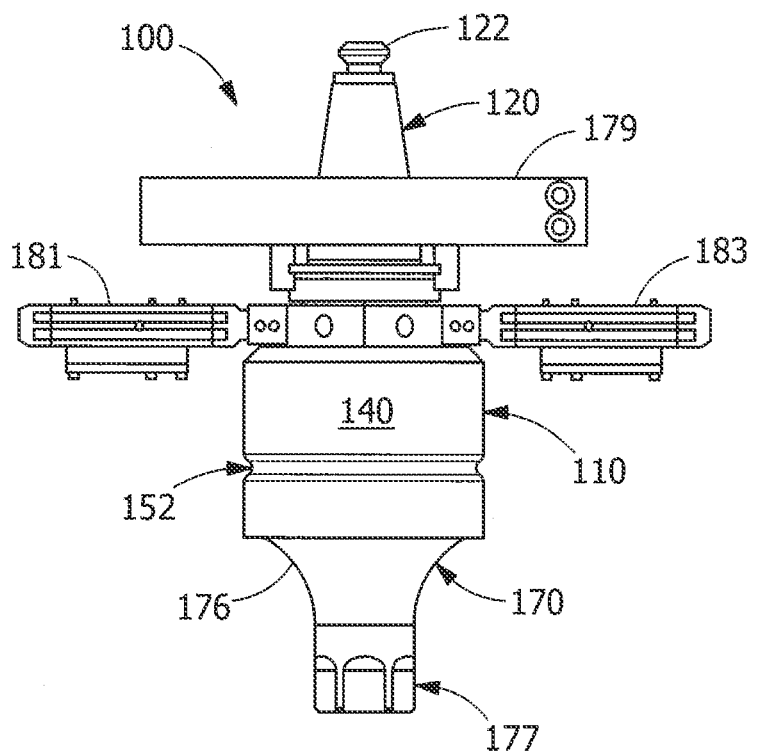
FIG. 3-4 are alternate side views of an ultrasonic machining module in accordance with a second embodiment of the present invention, wherein an external high-speed rotary connector has been included, and wherein the high-speed rotary connector is shown in the open position or condition.
Figure 4:
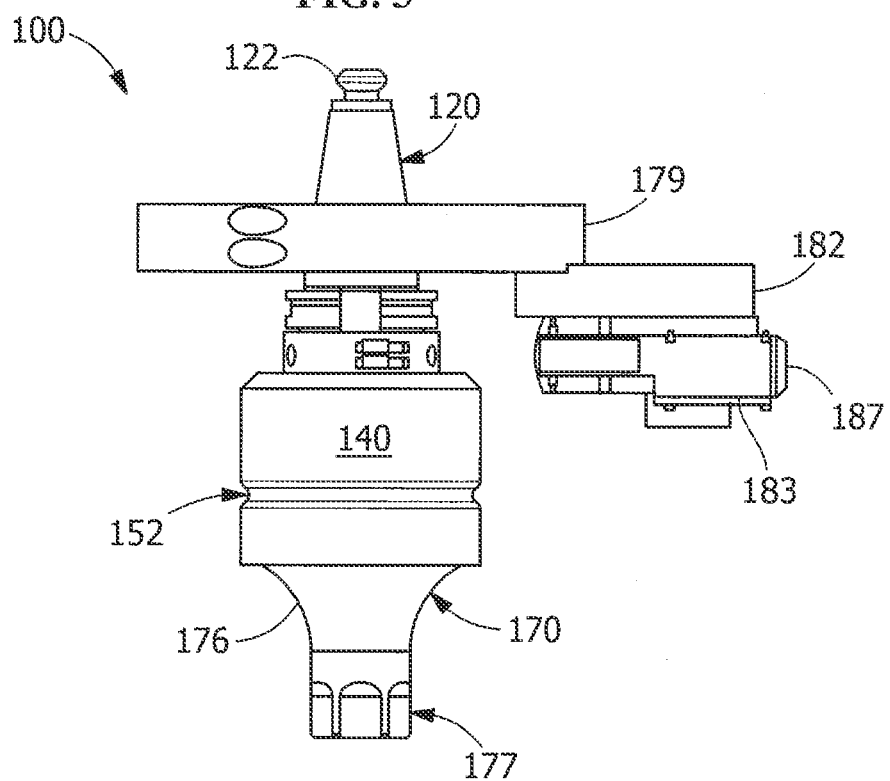
Figure 5:
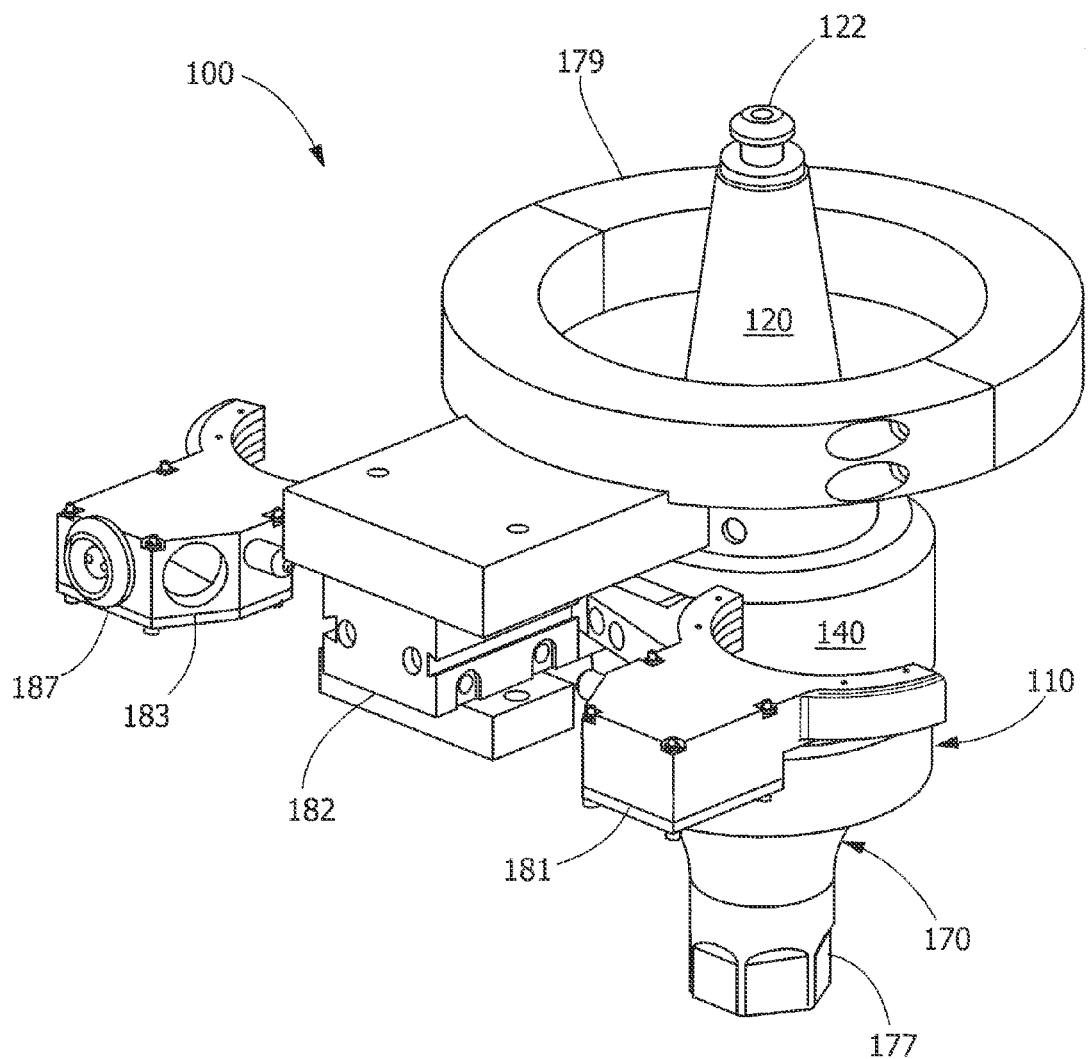
FIG. 5 is a perspective view of the ultrasonic machining module and high-speed rotary connector of FIGS. 3-4.
Figure 6:
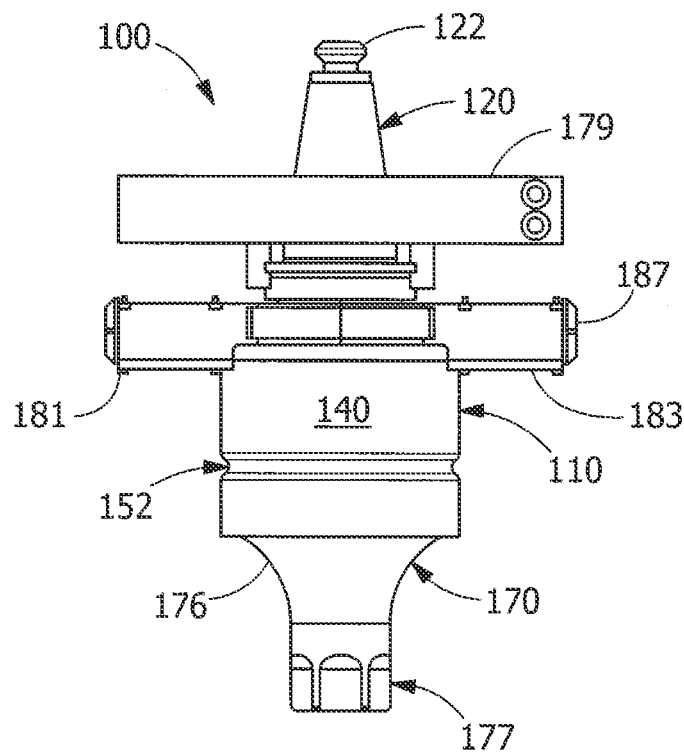
FIG. 6-7 are alternate side views of an ultrasonic machining module in accordance with a second embodiment of the present invention, wherein an external high-speed rotary connector has been included, and wherein the high-speed rotary connector is shown in the closed position or condition.
Figure 7:
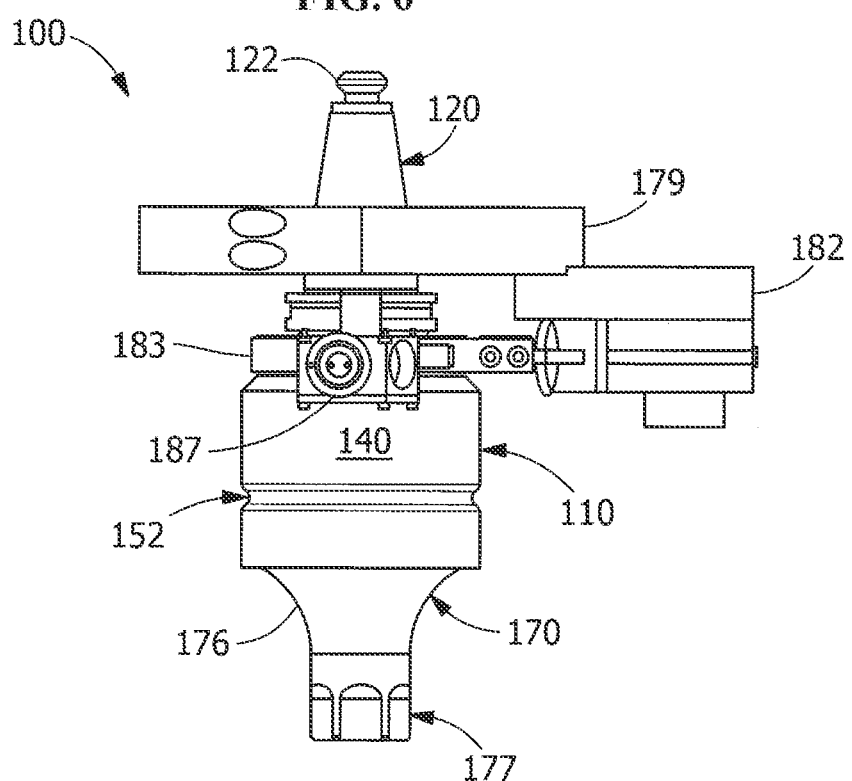
Figure 8:
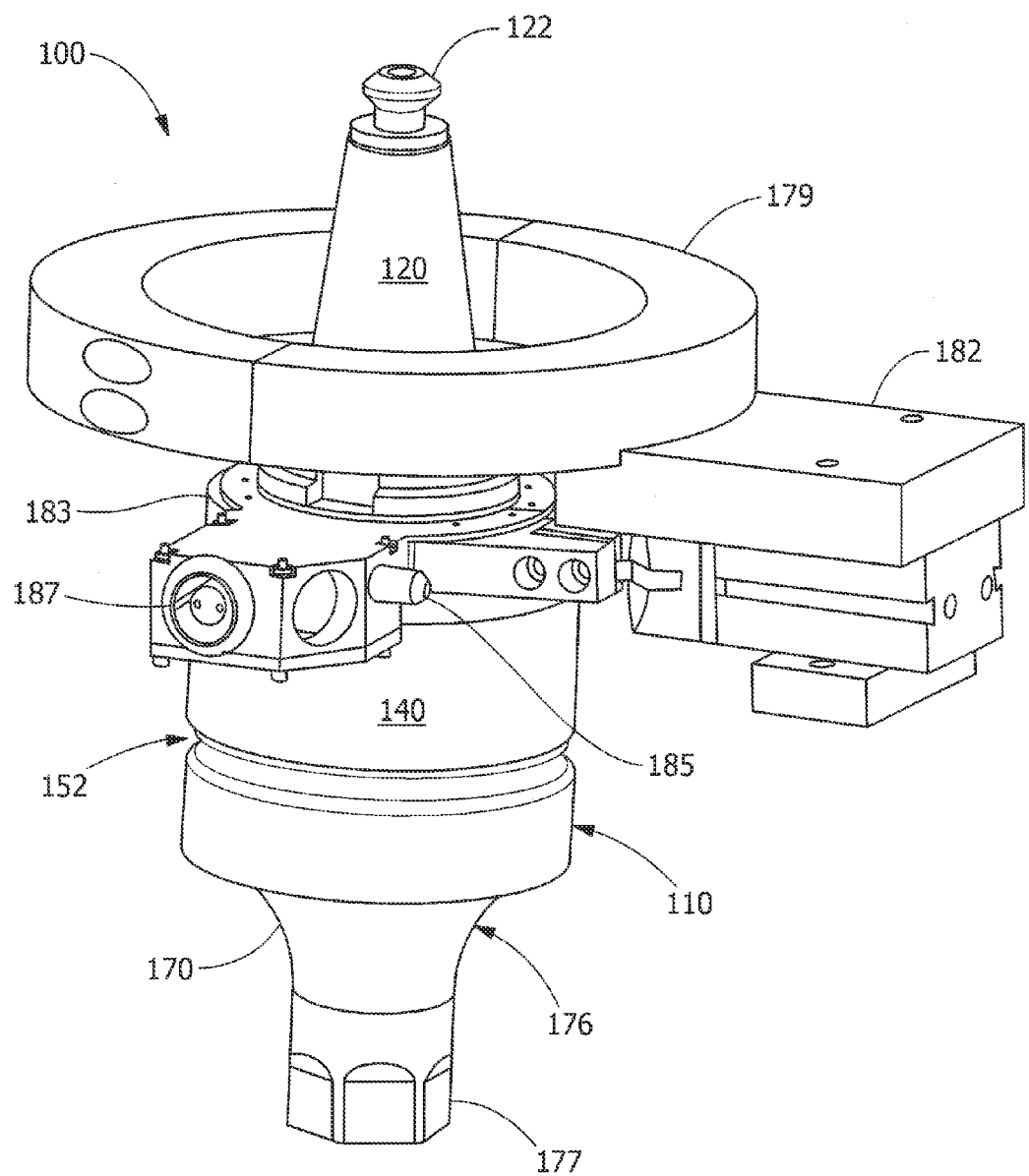
FIG. 8 is a perspective view of the ultrasonic machining module and high-speed rotary connector of FIGS. 6-7.
Figure 9:
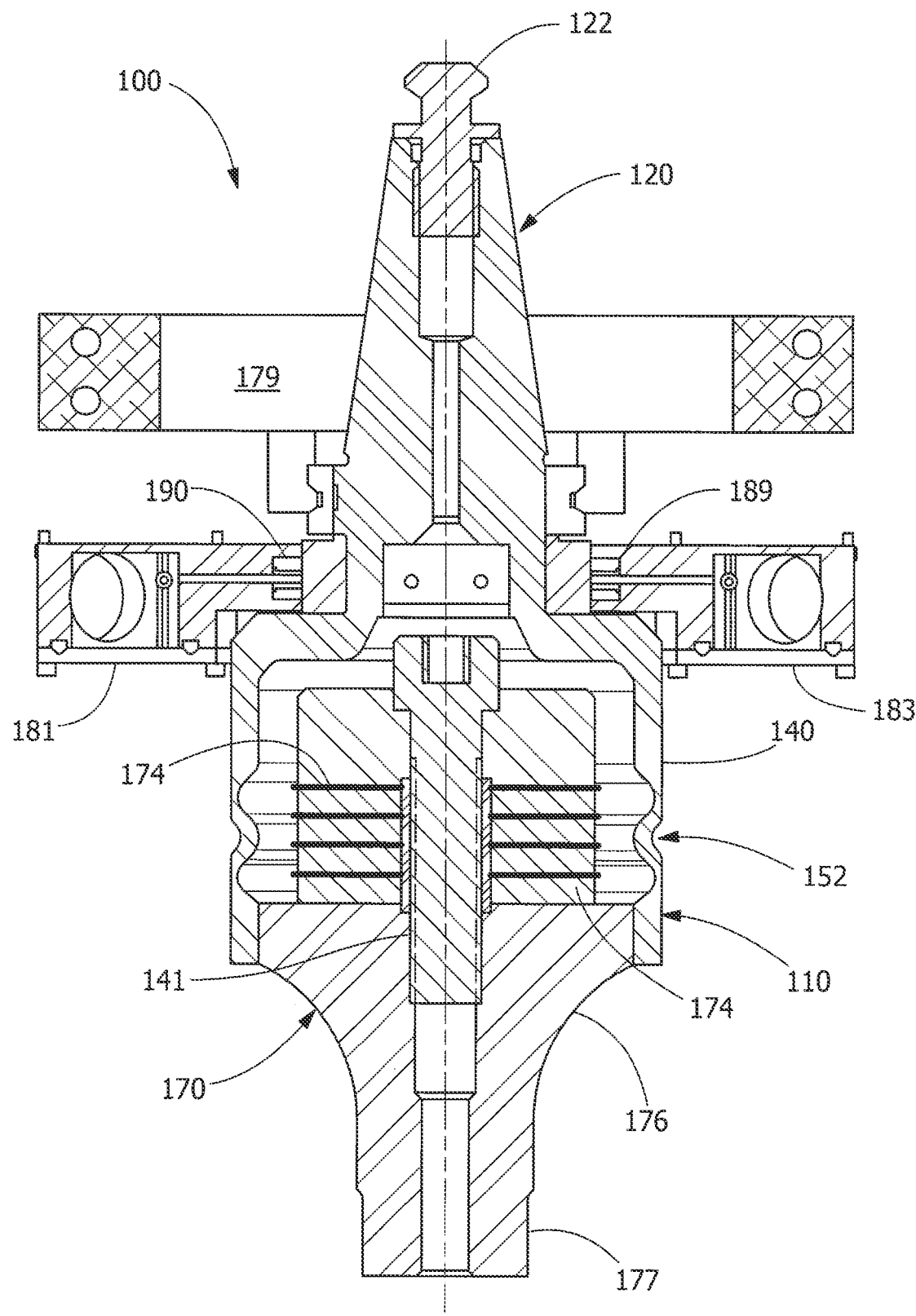
FIG. 9 is a cross-sectional side view of the ultrasonic machining module and high-speed rotary connector of FIGS. 6-7.

FIG. 3-4 provide alternate side views of an ultrasonic machining module in accordance with a second embodiment of the present invention, wherein an external high-speed rotary connector has been included, and wherein the high-speed rotary connector is shown in the open position or condition. FIG. 5 provides a perspective view of the ultrasonic machining module and high-speed rotary connector of FIGS. 3-4. FIGS. 6-7 provide alternate side views of an ultrasonic machining module in accordance with a second embodiment of the present invention, wherein an external high-speed rotary connector has been included, and wherein the high-speed rotary connector is shown in the closed position or condition. FIG. 8 provides a perspective view of the ultrasonic machining module and high-speed rotary connector of FIGS. 6-7 and FIG. 9 provides a cross-sectional side view of the ultrasonic machining module and high-speed rotary connector of FIGS. 6-7. The features shown in these Figures deliver electrical energy to the driving components of the ultrasonic transducer necessary to convert electrical energy into mechanical oscillations that are delivered to a machining tool connected to the ultrasonic machining module. As such, the base ultrasonic transducer design is expanded upon while maintaining the common Langevin type construction including a front mass, back mass, driving elements, compression member and tool attachment methods (e.g. collet). In the embodiment described below, the system for delivering electrical energy to the ultrasonic transducer is a high speed "external" system due to the fact that the components are all adapted to accommodate the external components of a machine tool spindle.

With reference to FIGS. 3-9, ultrasonic machining module 110 includes tool holder 120, retention knob 122, housing 140, compression stud 141, vibration-isolating region 152, ultrasonic transducer assembly 170, transducer back mass 172, piezoelectric ceramics 174, transducer front mass 176, collet 177, spindle face mount clamp 179, left-side slip ring clamshell arm 181, clamshell actuator 182, right-side slip ring clamshell arm 183, pneumatic air purge fitting 185, electrical cable fitting 187, electrical brush 189, and high-speed rotary electrical trace 190. In this embodiment, electrical delivery to ultrasonic machining module 110 is based on a clamshell design that opens to 180° for providing clearance to a tool changer arm. When ultrasonic machining module 110 is inserted into the spindle of a machining system by a tool changer, retention knob 122 is pulled by a drawbar into the mating faces of tool holder 120. Once seated, the tool changer device retracts and the clamshell actuator 182 closes left-side slip ring clamshell arm 181 at the same time as right-side slip ring clamshell arm 183. Once closed, high-speed rotary electrical trace 190 is mated by way of force contact with, and creates continuity around the perimeter of, electrical brushes 189. Electrical brushes 189 are affixed to a flexible spring such that rotating centrifigual force pushes electrical brushes 189 outward, thereby making contact against high-speed rotary electrical trace 190. Electrical current is introduced to high-speed rotary electrical trace 190 through electrical cable fitting 187, which is mated with a high voltage cable supplied with the system power supply. As part of this operation, a sylonoid valve is typically actuated to pressurize any internal passages for positively pressurizing clamshell housing arms 181 and 183 and preventing coolant/debris ingress and contamination thereof.

Figure 10:
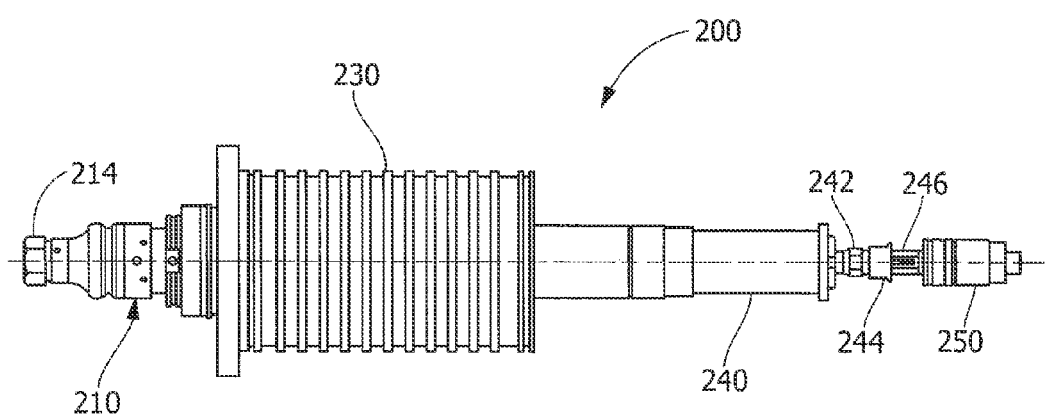
FIG. 10 is a side view of an ultrasonic machining module in accordance with a third embodiment of the present invention, wherein a high-speed rotary connector has been included on one end of a spindle assembly that has been adapted to include a through spindle coolant system.
Figure 11:
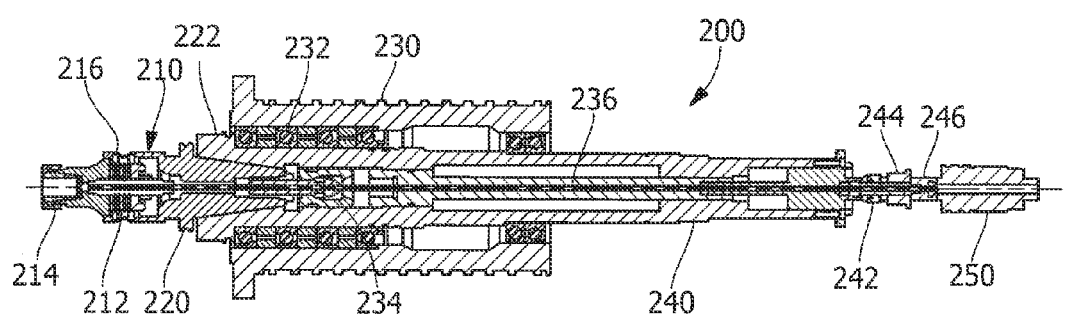
FIG. 11 is a cross-sectional side view of the ultrasonic machining module and high-speed rotary connector of FIG. 10.
Figure 12:
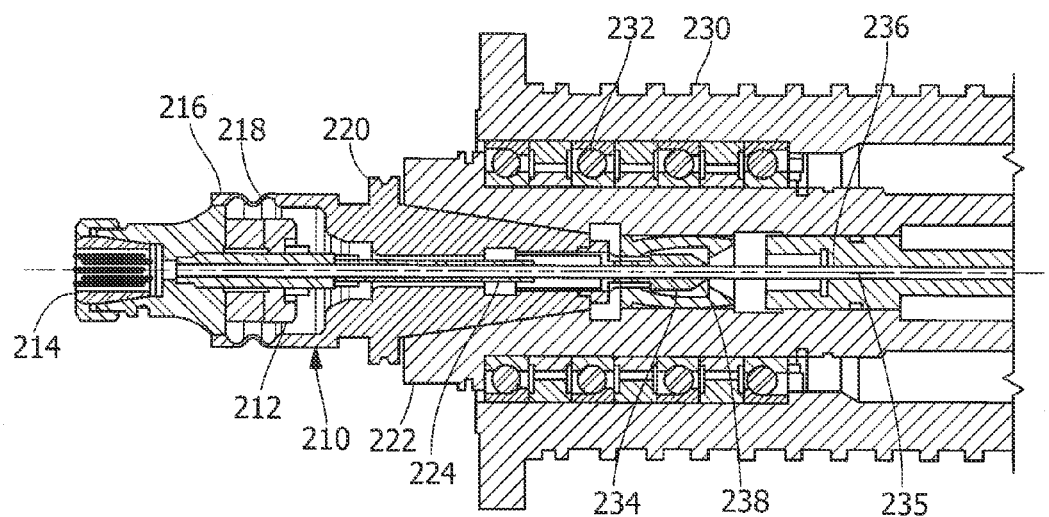
FIG. 12 is a cross-sectional side view of the ultrasonic machining module and high-speed rotary connector of FIG. 10 showing the portion of the spindle assembly that includes the ultrasonic machining module.
Figure 13:
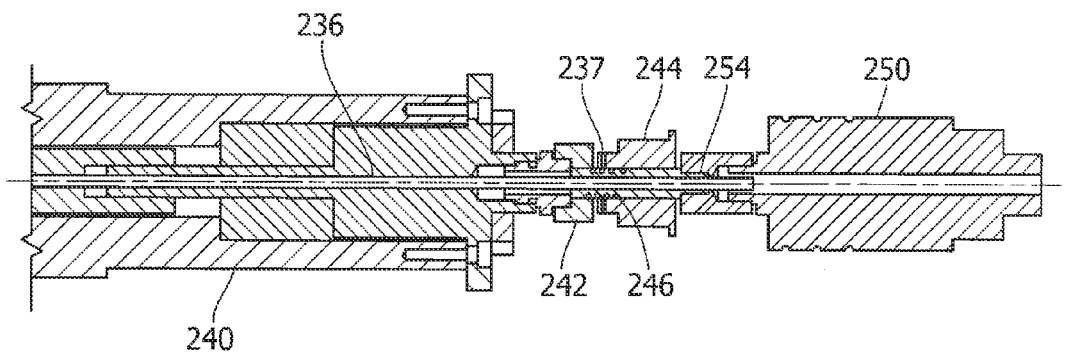
FIG. 13 is a cross-sectional side view of the ultrasonic machining module and high-speed rotary connector of FIG. 10 showing the portion of the spindle assembly that includes the rotary union.

FIG. 10 is a side view of an ultrasonic machining module in accordance with a third embodiment of the present invention, wherein a high-speed rotary electrical connector has been included on one end of a spindle assembly that has been adapted to include a through-spindle coolant system for delivering coolant fluid to a machining tool attached to the ultrasonic machining module. Rotating spindle assembly 200 includes ultrasonic machining module 210, collet 214 (which is adapted to receive machining tools), bearing housing 230, drive shaft 240, coolant adapter 242, rotary slip ring 244, alignment ring 246, and coolant rotary union 250. FIG. 11 provides a detailed cross-sectional side view of spindle assembly 200, wherein the following components are depicted in their relative positions within spindle assembly 200: ultrasonic module 200, ultrasonic transducer 212, collet 214, housing 216, tool holder 220, retention knob 222, bearing housing 230, bearing 232, electrical connection 234, electrode shaft 236, drive shaft 240, coolant adapter 242, rotary slip ring 244, alignment ring 246, and coolant rotary union 250. FIG. 12 provides a cross-sectional side view of the portion of spindle assembly 200 that includes ultrasonic machining module 210 and depicts the following additional structures: vibration dampening feature 218, transducer coolant coupler 224, electrical connection 234, electrode shaft 236, and coolant plug 238. FIG. 13 provides a cross-sectional side view of the portion of spindle assembly 200 that includes coolant rotary union 250 and depicts the following additional structures: electrode path 237 and coolant electrode seal 254.

In this embodiment, electrical energy is delivered to ultrasonic transducer 212 using conductors that are located in a central lengthwise passage (electrode shaft 236) formed in spindle assembly 200. The conductors run parallel through spindle assembly 200 and make electrical contact with electrodes located within retention knob 222 (which also positions tool holder 220 within housing 216) at electrical connection 234, wherein electrical connection 234 is typically a two conducer pin connection. Electrical connection 234 also includes a plug and stem; wherein plug 238 makes the electrical connection and the stem protrudes into the body of retention knob 222 for sealing the electrical components from coolant fluid passing through fluid conduit 235. Electrode shaft 236 includes a stainless steel inner sleeve for withstanding high pressure situations that develop within spindle assembly 200 during operations that include coolant fluid. For this connection to function with various tool changers, both positive and negative electrodes float in a manner that can be compressed with a plunger device during tool changing events (see description of fourth embodiment, below). Electrical energy is delivered by high voltage rotary slip ring 244, which is mounted on spindle assembly 200 on the end thereof that is opposite ultrasonic machining module 210. Rotary slip ring 244 exposes positive and negative electrode wiring through wiring passages 237, thereby permitting electrical connection to a processor main cable. Adjacent to rotary slip ring 244 is rotary union 250, which facilitates the use of conventional rotary connectors for passing coolant fluid (or air) through fluid conduit 235.

Figure 14:
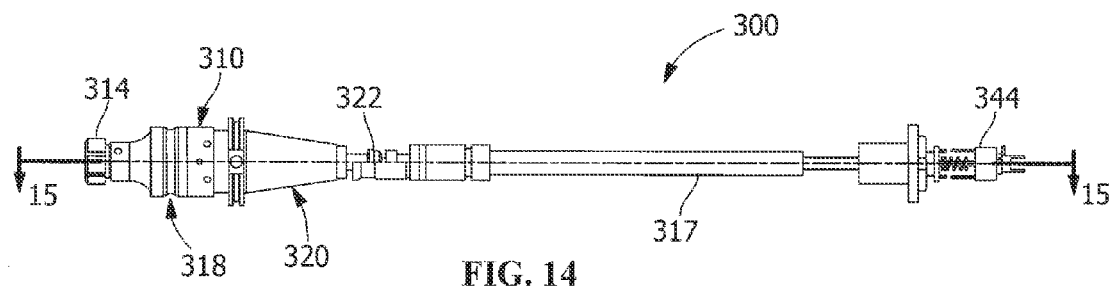
FIG. 14 is a side view of an ultrasonic machining module in accordance with a fourth embodiment of the present invention, wherein a high-speed rotary connector has been included on one end of a spindle assembly that does not include a through spindle coolant system.
Figure 15:
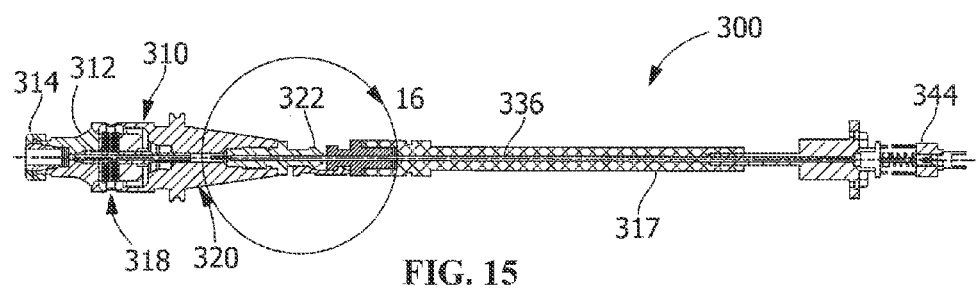
FIG. 15 is a cross-sectional side view of the ultrasonic machining module and high-speed rotary connector of FIG. 14.
Figure 16:
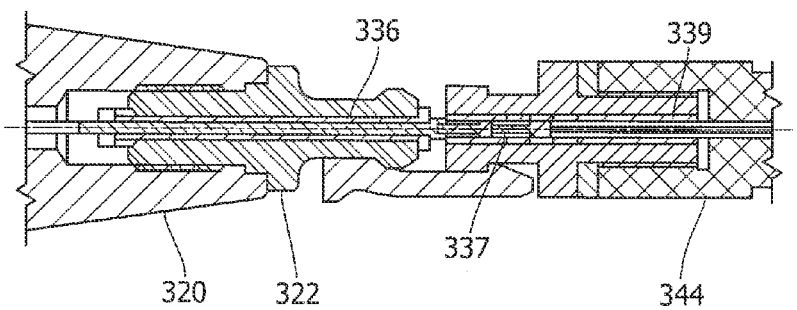
FIG. 16 is a cross-sectional side view of the ultrasonic machining module and high-speed rotary connector of FIG. 14 showing the portion of the spindle assembly that includes the rotary union.

FIGS. 14-16 provide side and cross-sectional views respectively of an ultrasonic machining module in accordance with a fourth embodiment of the present invention, wherein a high-speed rotary connector has been included on one end of a spindle assembly that includes an ultrasonic machining module, but that does not include a through spindle coolant system. Spindle assembly 300, which is similar to the previous embodiment, includes ultrasonic machining module 310, ultrasonic transducer 312, collet 314, vibration-isolating region 318, tool holder 320, retention knob 322, electrode shaft 336, floating electrode 337, spring-loaded plunger 339, and rotary slip ring 344. As with the previous embodiment, electrical energy is delivered to ultrasonic transducer 312 by using conductors that are located in a central lengthwise passage (electrode shaft 336) formed in spindle assembly 300. Electrical energy is delivered by high voltage rotary slip ring 344 that is mounted on spindle assembly 300 on the end thereof that is opposite ultrasonic machining module 310. Rotary slip ring 344 exposes positive and negative electrode wiring, thereby permitting electrical connection to a processor main cable. FIG. 15 provides a cross-sectional side view of ultrasonic machining module 310 showing the portion of spindle assembly 300 that includes high-speed rotary connector 344. As shown in FIG. 15, this embodiment utilizes floating electrodes 337 and spring-loaded plunger 339 for making this connection compatible with various tool changers. In FIGS. 13-14, spring-loaded plunger 339 is shown in a decompressed position.

While the present invention has been illustrated by the description of exemplary embodiments thereof, and while the embodiments have been described in certain detail, there is no intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

What is claimed:

1. A device for use in a machining system, comprising:
   (a) an ultrasonic transducer, wherein the ultrasonic transducer is adapted to receive a machining tool;
   (b) a vibration-isolating housing adapted to be both compatible with a machining system and to receive the ultrasonic transducer therein, wherein the housing further includes at least one modification for isolating all vibrations generated by the ultrasonic transducer when the device is in operation except axial vibrations transmitted to the machining tool, thereby preventing unwanted vibrations from traveling backward or upward into the machining system, wherein the at least one vibration-isolating modification further includes a circumferential contoured and thinned region formed in the housing at one or more predetermined locations; and
   (c) a connector in electrical communication with the ultrasonic transducer, wherein the connector is operative to supply electrical energy to the ultrasonic transducer, and wherein the connector is adapted to rotate at a predetermined speed.

2. The device of claim 1, wherein the ultrasonic transducer further comprises: a front mass; a back mass; a plurality of piezoelectric ceramics positioned between the front mass and the back mass; and a compression member passing through the front mass, back mass, and ceramics, wherein the compression member is operative to apply compressive force to the ceramics.

3. The device of claim 1, further comprising a tool holder, wherein the tool holder and the top portion of the housing are mechanically coupled to one another or are integrated with one another, and wherein the connector is adapted to be mounted to the tool holder.

4. The device of claim 3, wherein the connector further includes two separate arms that close around the tool holder when the device is in operation.

5. The device of claim 1, further comprising a rotating spindle assembly, wherein the connector is adapted to be mounted to the rotating spindle assembly.

6. The device of claim 5, wherein the rotating spindle assembly is adapted to receive coolant fluid therethrough for delivery to the machining tool.

7. The device of claim 1, further comprising a non-rotating spindle assembly, wherein the connector is adapted to be mounted to the non-rotating spindle assembly.

8. A device for use in a machining system, comprising:
   (a) an ultrasonic transducer, wherein the ultrasonic transducer is adapted to receive a machining tool;
   (b) a vibration-isolating housing adapted to be both compatible with a machining system and to receive the ultrasonic transducer therein, wherein the housing further includes at least one modification for isolating all vibrations generated by the ultrasonic transducer when the device is in operation except axial vibrations transmitted to the machining tool, thereby preventing unwanted vibrations from traveling backward or upward into the machining system, wherein the at least one vibration-isolating modification further includes a circumferential contoured and thinned region formed in the housing at one or more predetermined locations;
   (c) a connector in electrical communication with the ultrasonic transducer, wherein the connector is operative to supply electrical energy to the ultrasonic transducer, and wherein the connector is adapted to rotate at a predetermined speed; and (d) a tool holder, wherein the tool holder and the top portion of the housing are mechanically coupled to one another or are integrated with one another, and wherein the connector is adapted to be mounted to the tool holder.

9. The device of claim 8, wherein the ultrasonic transducer further comprises: a front mass; a back mass; a plurality of piezoelectric ceramics positioned between the front mass and the back mass; and a compression member passing through the front mass, back mass, and ceramics, wherein the compression member is operative to apply compressive force to the ceramics.

10. The device of claim 8, wherein the connector further includes two separate arms that close around the tool holder when the device is in operation.

11. The device of claim 10, wherein the connector further includes a mounting clamp for supporting the two separate arms that close around the tool holder when the device is in operation.

* * * * *